US010408946B2

(12) United States Patent
Pyke et al.

(10) Patent No.: US 10,408,946 B2
(45) Date of Patent: Sep. 10, 2019

(54) DEAD RECKONING-AUGMENTED GPS FOR TRACKED VEHICLES

(71) Applicant: Peck Tech Consulting Ltd., Magog (CA)

(72) Inventors: Sandy Pyke, Magog (CA); Nicholas J. Lavigne, Magog (CA); Joshua Marshall, Kingston (CA); Jonathan Peck, Magog (CA); Andrew Scott, Toronto (CA)

(73) Assignee: PECK TECH CONSULTING LTD., Magog (CA)

( * ) Notice: Subject to any disclaimer, the term of this patent is extended or adjusted under 35 U.S.C. 154(b) by 306 days.

(21) Appl. No.: 15/031,179

(22) PCT Filed: Oct. 21, 2014

(86) PCT No.: PCT/CA2014/000755
§ 371 (c)(1),
(2) Date: Apr. 21, 2016

(87) PCT Pub. No.: WO2015/058281
PCT Pub. Date: Apr. 30, 2015

(65) Prior Publication Data
US 2016/0238714 A1 Aug. 18, 2016

Related U.S. Application Data

(60) Provisional application No. 61/895,342, filed on Oct. 24, 2013.

(51) Int. Cl.
*G01S 19/49* (2010.01)
*G01S 19/03* (2010.01)
(Continued)

(52) U.S. Cl.
CPC ............ *G01S 19/49* (2013.01); *G01C 21/165* (2013.01); *G01S 19/03* (2013.01); *G01S 19/14* (2013.01);
(Continued)

(58) Field of Classification Search
CPC .......... G01S 19/03; G01S 19/39; G01S 19/40; G01S 19/49; G01C 21/165
(Continued)

(56) References Cited

U.S. PATENT DOCUMENTS 7,855,683 B2  12/2010  Razoumov et al.
8,160,617 B2   4/2012  Scales
(Continued)

*Primary Examiner* — Dao L Phan
(74) *Attorney, Agent, or Firm* — Blank Rome LLP

(57) ABSTRACT

The invention relates to an apparatus and method for augmenting the 3 dimensional position information obtained from the NAVSTAR satellite-based global positioning system ("GPS") system. Such systems can be impacted by physical obstacles that prevent the receipt of the satellite signals or as a result of sun spot activity that introduces noise into the signals thus causing them to become intermittently unavailable and/or making them less accurate in the course of normal operation. Therefore, an improved positioning solution that can operate under such poor GPS operational conditions is needed. The apparatus and method of the invention augments GPS with dead reckoning techniques when GPS signals are unavailable or inaccurate. The apparatus and method of the invention demonstrates highest value when applied to blasthole drill positioning applications in open-pit mines.

3 Claims, 3 Drawing Sheets

(51) Int. Cl.
    *G01S 19/40*     (2010.01)
    *G01S 19/14*     (2010.01)
    *G01S 19/39*     (2010.01)
    *G01S 19/53*     (2010.01)
    *G01C 21/16*     (2006.01)

(52) U.S. Cl.
    CPC .............. *G01S 19/39* (2013.01); *G01S 19/40* (2013.01); *G01S 19/53* (2013.01)

(58) Field of Classification Search
    USPC ..... 342/357.23, 357.32, 357.4; 701/469, 472
    See application file for complete search history.

(56) References Cited

U.S. PATENT DOCUMENTS

| | | |
|---|---|---|
| 2004/0230374 A1 | 11/2004 | Tzamaloukas |
| 2010/0328146 A1 | 12/2010 | Xie et al. |

DEAD RECKONING-AUGMENTED GPS FOR TRACKED VEHICLES

RELATED APPLICATIONS

This application is a national phase of PCT/CA2014/000755, filed on Oct. 21, 2014, which claims the benefit of U.S. Provisional Application No. 61/895,342, filed on Oct. 24, 2013. The entire contents of those applications are incorporated herein by reference.

TECHNICAL FIELD

The invention relates to an apparatus and method for augmenting the three-dimensional position information obtained from the NAVSTAR satellite-based global positioning system ("GPS") system. The apparatus and method demonstrates highest value when providing augmented position information to high-precision GPS-based guidance systems on blasthole drills that are routinely used in open pit (surface) mines.

BACKGROUND

Dead reckoning is a navigational technique which has been in use for centuries. Dead reckoning calculates the current position of an object based on a previous position of the object in view of the speed and direction travelled from the previous position. Disadvantageously, dead reckoning is subject to significant error, particularly when speed and direction are not measured accurately.

The NAVSTAR (US government owned and operated) GPS constellation comprises a network of 27 Earth orbiting satellites. A complementary space-based network called GLONASS (Russian government owned and operated) consists of an additional 24 satellites. In order to determine the position of an object using GPS/GLONASS, a GPS, GLONASS or combined GPS/GLONASS receiver on the object must determine the location of at least four GPS/GLONASS satellites and the distance between the object and each of the at least four satellites. Disadvantageously, the GPS/GLONASS system cannot be used to calculate position when the GPS/GLONASS receiver does not receive signals from at least four GPS/GLONASS satellites.

The introduction of high-precision global positioning systems ("HPGPS") to the surface mining industry has resulted in significant improvements in productivity, and is expected to take an essential role as an enabling technology in future efforts to automate mining activities. In a standard system, GPS/GLONASS output is used directly for positioning. However, such systems can be impacted by physical obstacles that prevent the receipt of the satellite signals or as a result of sun spot activity that introduces noise into the signals thus causing them to become intermittently unavailable and/or making them less accurate in the course of normal operation. Therefore, an improved positioning solution that can operate under such poor GPS operational conditions is needed. The apparatus and method of the invention augments GPS with dead reckoning techniques when GPS signals are unavailable or inaccurate.

SUMMARY OF THE INVENTION

The invention relates to an augmented GPS ("aGPS") apparatus and method, which alleviates the availability problem of a GPS receiver only (does not take into account a loss of GLONASS receiver signal) by combining it with dead reckoning techniques. The invention may be used in relation to a number of vehicle types (for example: tracked vehicles such as blasthole drills, excavators and bulldozers, or rubber tired vehicles such as haul-trucks and graders). The invention is particularly suited to blasthole drills. During operation, a blasthole drill typically travels for two minutes, stops and has its jacks lowered, drills for between thirty (30) and sixty (60) minutes, has its jacks retracted and travels an additional two (2) minutes where the process is repeated. In most cases, it is desirable for the blasthole drill to travel in a straight line for an extended period of time and distance.

The augmented GPS of the invention introduces an intermediate step between the GPS receiver and the machine. Under normal conditions, the GPS output of the invention is identical to a GPS system. However, under degrading space-based GPS satellite conditions, the system instead estimates the motion of the machine based on local sensor measurements, and uses this to extrapolate the last known GPS position. This constructed position is output in place of the unavailable GPS position. This process of extrapolation continues until either the GPS situation improves, or the uncertainty in the constructed position exceeds a predefined maximum allowable value. The target precision of this system is to estimate the vehicle position within six (6) inches of its true value over a travelled distance of one hundred (100) feet (0.5%).

In accordance with one aspect of the present invention, there is provided an augmented global positioning system ("aGPS") for a vehicle comprising:
(a) an aGPS computer;
(b) a standard global positioning system ("GPS") system operatively connected to said aGPS computer, the standard GPS comprising:
(i) a high-precision GPS receiver;
(ii) a navigation system; and
(iii) a switch for alternating between a use of the standard GPS and the aGPS; and
(c) a chorus subsystem operatively connected to the standard GPS, the chorus subsystem comprising:
(i) a chorus data acquisition (DAQ) module;
(ii) a gyroscope operatively connected to the chorus DAQ; and
(iii) at least two rotation sensors operatively connected to the chorus DAQ.

In accordance with another aspect of the present invention, there is provided a method for determining the position of a moving vehicle using augmenting global positioning system ("aGPS"), the method comprising the steps of:
(a) calculating a first position of the vehicle using a global positioning system ("GPS");
(b) upon losing the GPS signal, measuring the movement of the vehicle and calculating the position of the vehicle using the last known position of the vehicle from the GPS combined with dead reckoning;
(c) upon reacquiring a GPS signal, comparing the first position of the vehicle to the calculated position; and
(d) correcting error in said calculated position.

DETAILED DESCRIPTION

Figure 1:
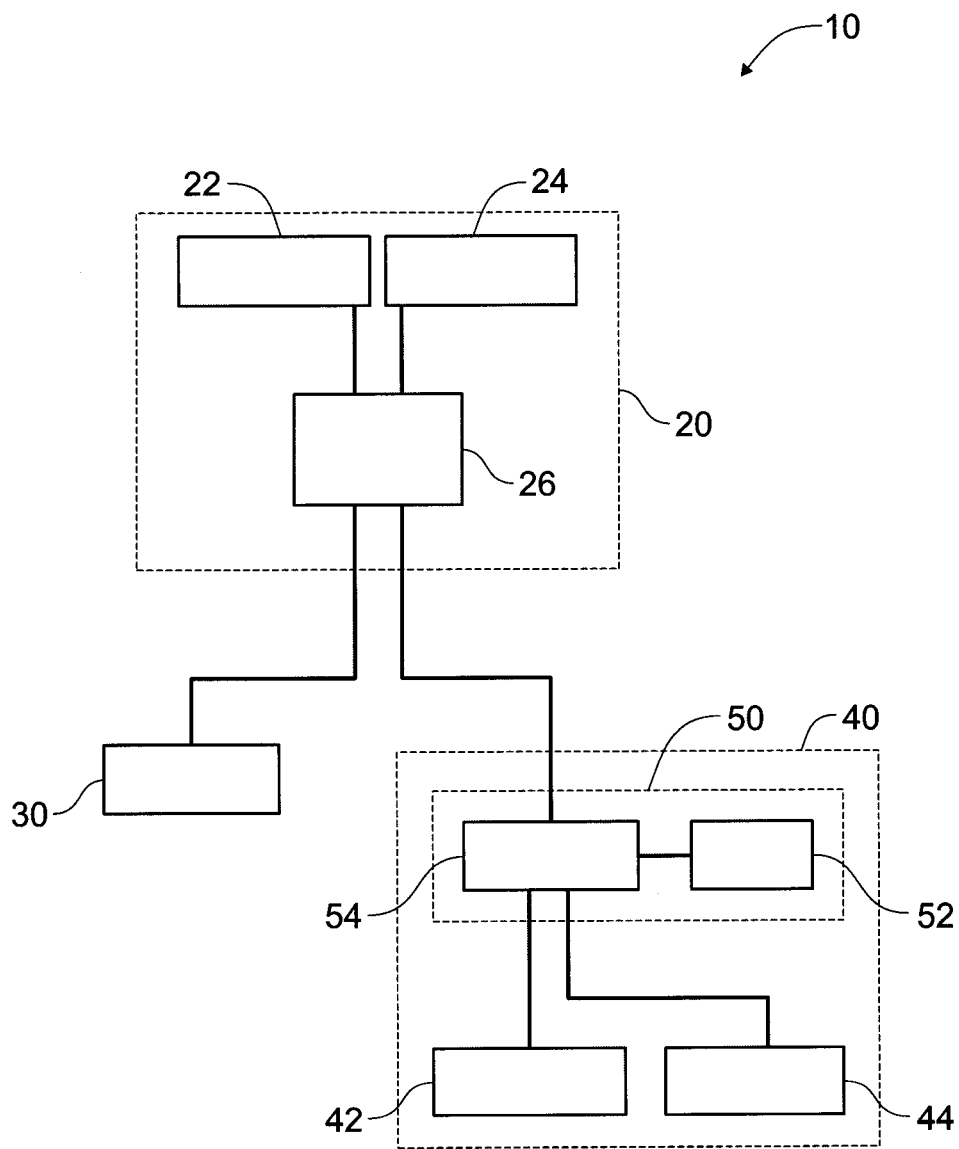
FIG. 1 is a schematic showing a first embodiment of the invention.

Referring to FIG. 1, a first embodiment of a high-availability global positioning system with local sensor augmentation (10) of the invention is shown. The system (10) is preferably used with blasthole drills, for example the Atlas Copco™ PV-271 blasthole drill. The system comprises a standard GPS system (20), an aGPS computer (30), and a chorus subsystem (40).

The standard GPS system (20) comprises a dual-antenna high-precision GPS receiver (22), a navigation system (24), and a switch (26). The switch (26) allows the system to alternate between operation when a GPS signal is available, during which time the standard GPS system (20) is used, and when the GPS signal is not available, during which time the chorus subsystem (40) is used.

The aGPS computer (30) acts as the processing unit for system (10), receiving sensor data as input and producing vehicle position information as output.

The chorus subsystem (40) comprises a left rotation sensor (42), a right rotation sensor (44), and a chorus enclosure (50). Preferably, the left rotation sensor (42) and the right rotation sensor (44) are rotary encoders capable of measuring angular positions of the left and right wheels of the vehicle. The sensors (42) and (44) use a polarized magnet-sensor pair to sense the angular positions of the left and right drive motors, which directly drive the vehicle's crawler tracks. From sensors (42) and (44), the distance travelled by the vehicle is measured. The chorus enclosure (50) comprises a gyroscope (52) and a chorus data acquisition module (54). The gyroscope (52) obtains angular rate measurements about the vehicle's turning axis of rotation. For example, the gyroscope may be an ADIS16130 single-axis MEMS gyroscope produced by Analog Devices™. The chorus data acquisition module (54) comprises a supporting hardware unit which forwards sensor measurements from the left rotation sensor (42), right rotation sensor (44), and the gyroscope (52) to the aGPS computer (30).

Figure 2:
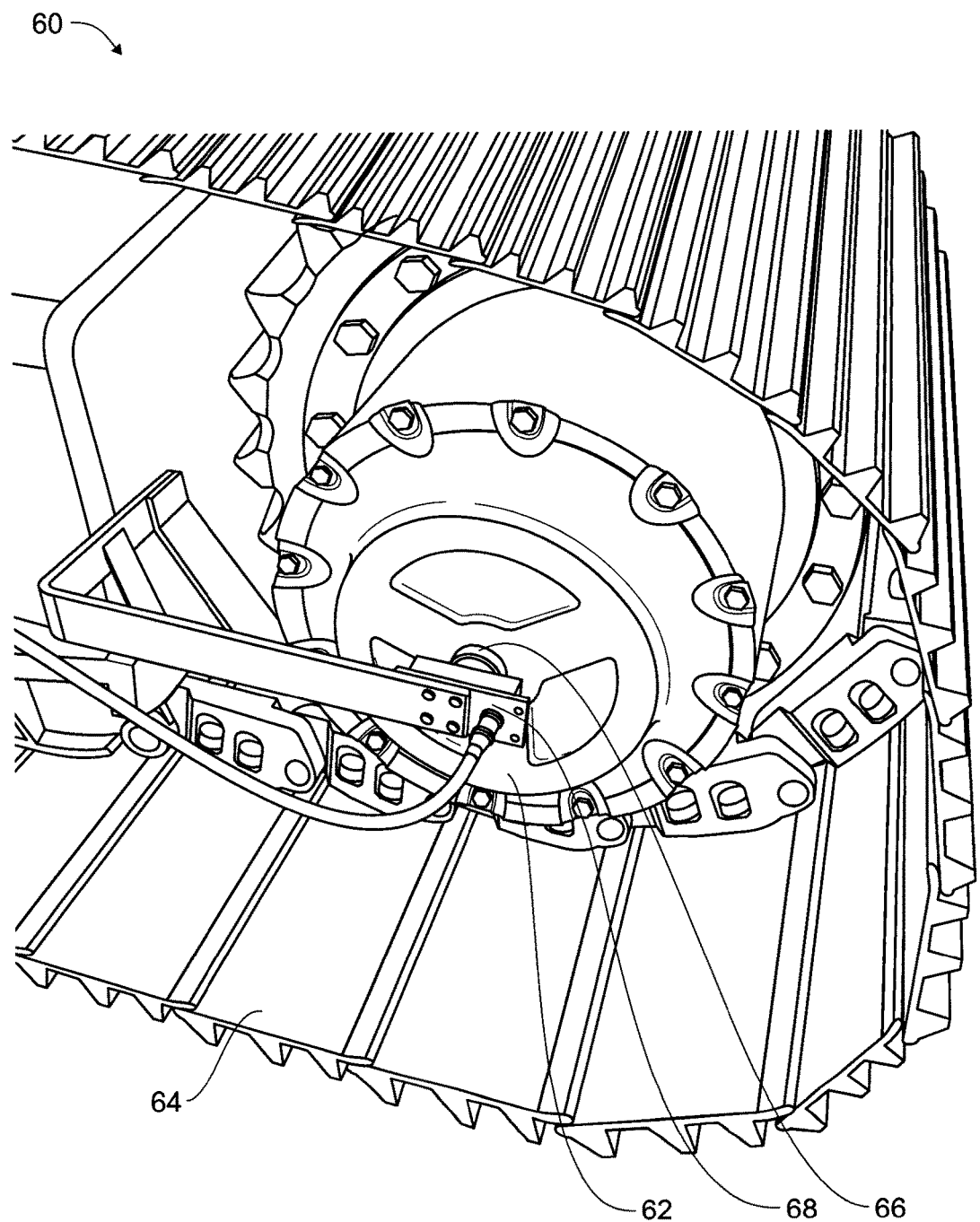
FIG. 2 is a prospective side view showing an exemplary mounting location of a wheel sensor assembly.

Referring to FIG. 2, an exemplary mounting location of a wheel sensor assembly is shown. A magnetic wheel sensor assembly (60) is shown in association with a hydraulic propel motor (62) of a crawler track (64). The magnetic wheel sensor assembly (60) consists of a polarized magnet (66) and a nearby magnetic pickup sensor (68). The sensor is preferably a two-axis magnetometer (essentially a digital compass). The magnet (66) is rigidly attached to the wheel and rotates with it, thus the magnet's "north" rotates with the wheel. The sensor is able to sense the direction of this magnetic "north" as it rotates, thus providing an instantaneous angular position of the wheel. Alternatively, rotary encoders of any type capable of the required precision may be substituted for the magnet-based sensors.

Figure 3:
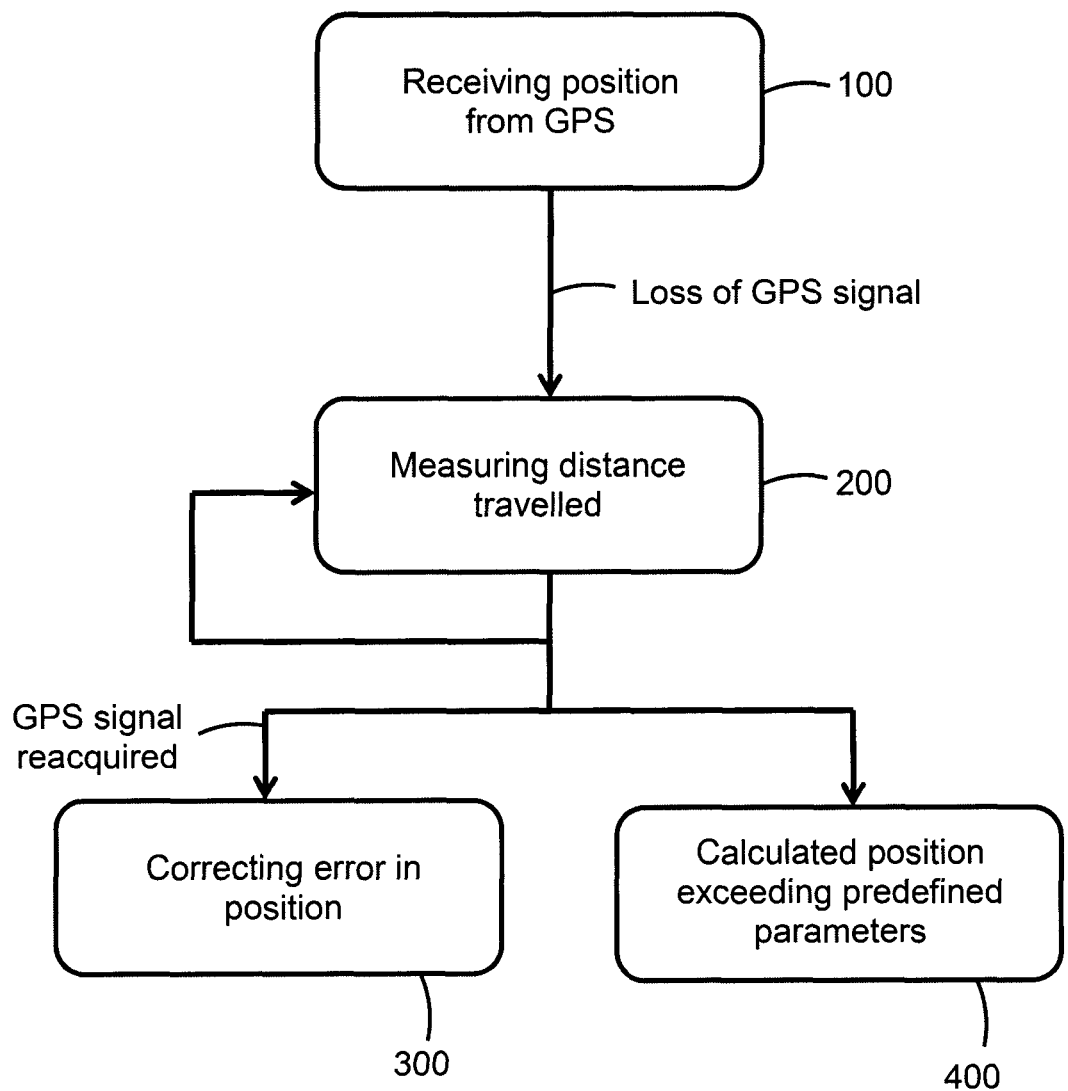
FIG. 3 is a flow chart showing a method of augmenting GPS according to an embodiment of the invention.

Referring to FIG. 3, a method of the present invention is shown. During normal operation, a vehicle receives positional information from the standard GPS system (20) (Step 100). However, upon losing the GPS signal, the movement of the vehicle is measured and the new vehicle position is calculated in using chorus subsystem (40) (Step 200). This Step 200 comprises measuring the distance the vehicle has travelled using at least two wheel sensors. Step 200 further comprises measuring the direction the vehicle has travelled. Preferably, this is performed using at least one gyroscope (52). Step 200 may be repeated as necessary in response to intermittent GPS signals. Upon reacquiring a GPS signal, the first position of the vehicle is compared to the calculated position of Step 200 and any error in the calculated position is corrected (Step 300). Alternatively, the process may stop when the calculated position exceeds a predefined maximum allowable value (Step 400).

The aGPS computer (30) contains a filter algorithm in order to maintain an optimal estimate of the position and orientation of the vehicle as it travels from point to point. The filter is an unscented Kalman filter (UKF)-based design incorporating wheel rotation sensors (42, 44), a gyroscope (52), and a HPGPS (22) which is intermittently unavailable.

Nomenclature

In the following description, capital letters are used to denote quantities in an absolute "world" reference frame and lowercase letters to denote those in other reference frames. The global frame is a Cartesian frame predefined by the mine site and measured in metres. Mine site coordinates are specified in terms of a Northing (metres in the N direction), Easting (metres in the E direction), and an ellipsoidal height. For convenience, the "world frame" is a right-handed 3-D Cartesian frame comprising (X, Y, Z), where X is in the direction of the Easting, Y is in the direction of the Northing, and Z points upward and is related to the ellipsoidal height.

A vehicle's local frame is defined similarly. It is a right-handed Cartesian frame comprising (x,y,z), where x is measured in the vehicle's "forward" direction, y is measured in the "leftward" direction, and z is in the upward direction. The vehicle's frame is defined to be directly between the track midpoints, at ground level. Orientations are specified in terms of the coordinate axes. Rotations and orientations about the world frame's (X, Y, Z) axes are denoted $\Theta_X$, $\Theta_Y$, $\Theta_Z$ respectively. Similarly, in the vehicle frame, $\theta_X$, $\theta_Y$, $\theta_Z$ are used for orientations. A hat (ˆ) is used to denote an estimated quantity.

State

Assuming the vehicle travels in a 2-D plane, only a subset of state variables are needed to achieve the desired accuracy. The state to be estimated is denoted q and consists of the global position and orientation of the vehicle's frame. It is represented as:

$$q = \begin{bmatrix} X \\ Y \\ \Theta_Z \end{bmatrix}.$$

The state q has an associated 3×3 covariance matrix P.

Initialization

The above filter must be initialized using an absolute coordinate reference. Initialization can occur when two conditions are simultaneously met:

1. an RTK GPS fix is available. With this, the state variables X and Y can be initialized with the vehicle's current location in the absolute world coordinate frame; and
2. the vehicle is moving in a straight line, either forward or reverse. Since a single-antenna GPS receiver cannot measure its orientation, a heading is constructed based on consecutive GPS readings as detailed in the section entitled "Absolute Heading Estimate", below.

Since the RTK fix is not always available and since the vehicle spends most of its time stationary, it can take a long time for the above two conditions to be met under normal operating conditions. However, this can be remedied by making use of dual-antenna GPS hardware. The provision of a dual-antenna GPS hardware would remove condition "2"

and allow the filter to initialize any time the RTK fix is available, regardless of the vehicle's motion.

Absolute Heading Estimate

While in theory, the GPS can reports its orientation via the HDT message, this is not a viable option likely due to the low speed of the drill. As an alternative, a heading can be constructed using the output GPS coordinates while the vehicle is moving.

If the vehicle is moving, assuming two consecutive GPS coordinate readings $(X_1, Y_1)$ with uncertainty $(\sigma_{X1}, \sigma_{Y1})$ and $(X_2, Y_2)$ with uncertainty $(\sigma_{X2}, \sigma_{Y2})$, the heading $\Theta_Z$ can be computed as $$\beta = \frac{Y_2 - Y_1}{X_2 - X_1},$$

$$\Theta_Z = \arctan(\beta).$$

Using the standard error propagation formula, the uncertainties are $$\sigma_\beta = \sqrt{\frac{1}{(X_2 - X_1)^2}(\sigma_{Y2}^2 + \sigma_{Y1}^2) + \frac{(Y_2 - Y_1)^2}{(X_2 - X_1)^4}(\sigma_{X2}^2 + \sigma_{X1}^2)},$$

and $$\sigma_{\Theta_Z} = \frac{\sigma_\beta}{1 + \beta^2}.$$

Since the above process implicitly assumes that the vehicle is moving in a straight line (i.e. $\dot{\theta}_Z = 0$), an addition error component, $\sigma_m$, is defined to account for error due to movement during the measurement. This additional error can be expressed as:

$$\sigma_m = \frac{d_R - d_L}{W},$$

where $d_R$ and $d_L$ are the differential distances moved by the tracks during the measurement interval, and W is the distance between the tracks. If the vehicle is actually moving in a straight line, then $d_R \approx d_L$ and $\sigma_m \approx 0$. Thus, $\sigma_{\Theta_Z}$ is defined to be:

$$\sigma_{\Theta_Z} = \frac{\sigma_\beta}{1 + \beta^2} + \sigma_m.$$

A number of conditions on the input data are enforced before applying the above procedure to construct a heading estimate. If any of these conditions fail, no computed heading is available. The conditions are:

1. Both GPS data points $(X_1, Y_1)$ and $(X_2, Y_2)$ must have RTK precision.

2. There is a minimum distance between the GPS data points. The distance d is computed using the formula:

$$d = \sqrt{(X_2 - X_1)^2 + (Y_2 - Y_1)^2}$$

The threshold used is $d_{min} = 0.1$ m. Thus, this condition is met if $d \geq d_{min}$.

3. The track speed of the left and right tracks must be similar. This confirms that the drill is travelling in a straight line, either forward or backward. The distance travelled by each track during the interval between data points denoted $dr_L$ and $dr_R$ are computed using the difference sin angular values with a constant found by calibration. The absolute value of their difference $\Delta dr$ is then compared against a threshold value $\Delta dr_{max}$.

Absolute Position Estimate

The absolute position X, Y, Z is obtained directly from the HPGPS' PTNL, PJK message. Since the GPS is not located at the defined machine origin, the reported values must be transformed into the machine frame using the most recent estimate of $\Theta_Z$. Defining the offset of the GPS antenna in the vehicle's frame as $(x_{GPS}, y_{GPS})$, the absolute position of the GPS is $$\begin{bmatrix} X_{GPS} \\ Y_{GPS} \end{bmatrix} = \begin{bmatrix} X \\ Y \end{bmatrix} + \begin{bmatrix} \cos\Theta_Z & -\sin\Theta_Z \\ \sin\Theta_Z & \cos\Theta_Z \end{bmatrix} \begin{bmatrix} x_{GPS} \\ y_{GPS} \end{bmatrix} \quad (1)$$

The corresponding covariance P is obtained directly from the GST message. This formulation can be extended to the full 3D case later if necessary.

Vehicle Kinematic Model

A tracked vehicle is modelled as a differential-drive vehicle with two wheels separated by a distance W. Using measurements from the wheel encoders and an experimentally-determined calibration constant, the differential distances each track has moved since the last step can be measured. For the right and left tracks respectively, these are $\Delta r_R$ and $\Delta r_L$. The updated equation is $$q_{k+1} = q_k + G_{s,k} u_k \quad (2)$$

$$= \begin{bmatrix} x_k \\ y_k \\ \theta_{z,k} \end{bmatrix} + \begin{bmatrix} 0.5\cos\theta_{z,k} & 0.5\cos\theta_{z,k} \\ 0.5\sin\theta_{z,k} & 0.5\sin\theta_{z,k} \\ 1/W & -1/W \end{bmatrix} \begin{bmatrix} \Delta r_R \\ \Delta r_L \end{bmatrix}. \quad (3)$$

State Update

The filter's UKF-based estimation algorithm uses the familiar predict-update cycle to maintain its state estimate.

The prediction (a-priori) step is always done and is based on dead reckoning measurements. The basic premise is to use the kinematic model, described above, in a UKF a-priori step with a modification incorporating both wheel encoders and the z-gyro as measurements for rotation. First, the rotation due to wheels $\Delta\theta_w$ and the uncertainty $\sigma_w$ of the same is defined:

$$\Delta\sigma_w = \frac{\Delta r_L - \Delta r_R}{W}$$

$$\sigma_w = \sqrt{\frac{(F_w \Delta r_R + C_w)^2 + (F_w \Delta r_L + C_w)^2}{W}},$$

where $F_w$ and $C_w$ are constants. Next a simple condition is used to determine whether the vehicle is currently moving:

$$\frac{\Delta r_R + \Delta r_L}{2} \geq D_{min}$$

where $D_{min}$ is a constant threshold. Depending on whether the condition (4) is true, one of the following is performed:

1. If (4) is true, the vehicle is moving. Thus a rotation measurement is obtained from the z-gyro:

$$\Delta\theta_g = Tg_z - b_z$$

$$\sigma_g S_g,$$

where $g_z$ is the current raw measurement from the gyroscope (in units of rad/s), T is the timestep, $b_z$ is the constant gyro bias (discussed below in step "2"), and $S_g$ is the constant uncertainty of the gyro measurements. Next the combined equivalent measurement and uncertainty as the uncertainty-weighted mean of the values from the wheels and the gyro is calculated:

$$\sigma_c = \frac{1}{\frac{1}{\sigma_w^2} + \frac{1}{\sigma_g^2}}.$$

$$\Delta\theta_c = \sigma_c \left( \frac{\Delta\sigma_w}{\sigma_w^2} + \frac{\Delta\theta_g}{\sigma_g^2} \right).$$

With the uncertainties correctly adjusted, this scheme tends to trust the gyroscope measurements more while moving, and the wheel sensor measurements while moving slowly or stationary.

2. If (4) is false, we consider the vehicle to be stationary. In this case, the combined rotation values are those of the wheels alone:

$$\Delta\theta_c = \Delta\theta_w$$

$$\sigma_c = \sigma_w.$$

Since the gyroscope's bias $b_z$ drifts over time, the (stationary) time can be used to estimate its current value. A (normal) Kalman filter is used to track both the gyroscope bias $b_z$ and its uncertainty $\sigma_b$. The expression $\Delta\theta_g - \Delta\theta_w$ represents a measurement of its current value, and incorporates it into $b_z$ using one step of the Kalman filter. This filter is effectively only an a-posteriori step.

The a-priori step is then done using an unscented transformation, and incorporating $\Delta\theta_c$ in place of $\Delta\theta_w$ in the deconstructed model (2).

The update step is done according to one of the cases below.

1. Case 1: RTK fix available and the conditions of "Absolute Heading Estimation" are fulfilled. In such a case, a heading is constructed as detailed in that section. The machine state q is transformed into the GPS frame using the inverse of Equation (1), and a full-state update is done in the GPS frame using the usual UKF update step with the recent GPS position and constructed heading.

2. Case 2: RTK fix available, but the conditions of "Absolute Heading Estimate" are not fulfilled. In such a case, the machine state q is transformed into the GPS frame using the inverse of Equation (1), and a partial-state update is done in the GPS frame using the usual UKF update step with the recent GPS (X, Y) position.

3. Case 3: RTK is not available, in which case, the update step is skipped.

A person of skill in the art would recognize that the type, number, and position of said sensors and gyroscope may be varied according to the intended use.

The scope of the claims should not be limited by the preferred embodiments set forth in the examples, but should be given the broadest interpretation consistent with the description as a whole.

The invention claimed is:

1. An augmented global positioning system ("aGPS") for a vehicle comprising:
   an aGPS computer;
   a standard global positioning system ("GPS") system operatively connected to the aGPS computer, the standard GPS comprising:
      a high-precision GPS receiver;
      a navigation system; and
      a switch; and
   a chorus subsystem operatively connected to the standard GPS, the chorus subsystem comprising:
      a chorus data acquisition (DAQ) module;
      a gyroscope operatively connected to the chorus DAQ; and
      at least two rotation sensors operatively connected to the chorus DAQ;
   wherein the switch is configured to alternate between a use of the standard GPS and the chorus subsystem; and
   wherein, upon a reacquiring of a GPS signal by the standard GPS subsequent to a loss of a GPS signal by the standard GPS, the aGPS computer is configured to compare a first position of the vehicle obtained by the standard GPS prior to the loss of the GPS signal to a calculated position of the vehicle obtained by the chorus subsystem.

2. The aGPS of claim 1, wherein the two rotation sensors comprise a left rotation sensor and a right rotation sensor.

3. The aGPS of claim 1, wherein the aGPS computer is configured to correct an error in the calculated position using the comparison of the first position of the vehicle to the calculated position of the vehicle.

* * * * *